Oct. 20, 1936. J. T. SPRINGER 2,057,798
CASING SIDE WALL PATCH
Filed Feb. 15, 1932 2 Sheets-Sheet 1
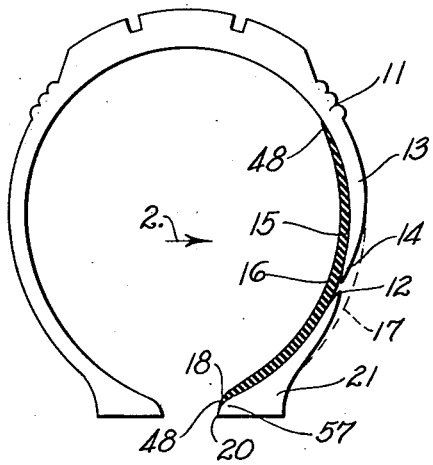
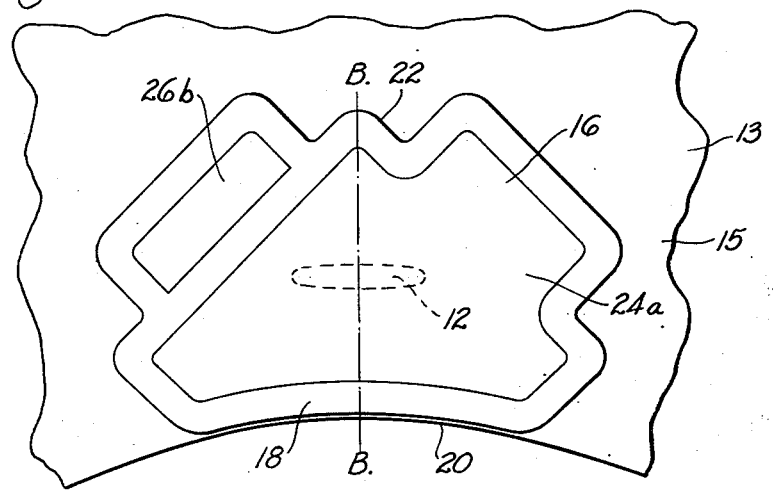
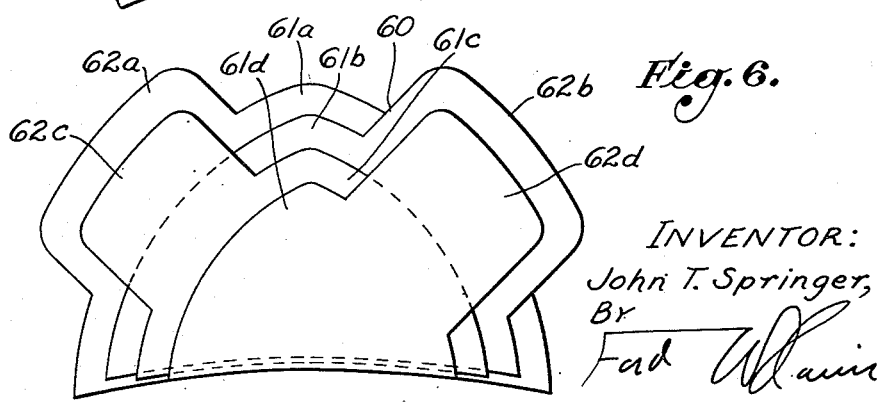
INVENTOR:
John T. Springer,
BY
ATTORNEY.

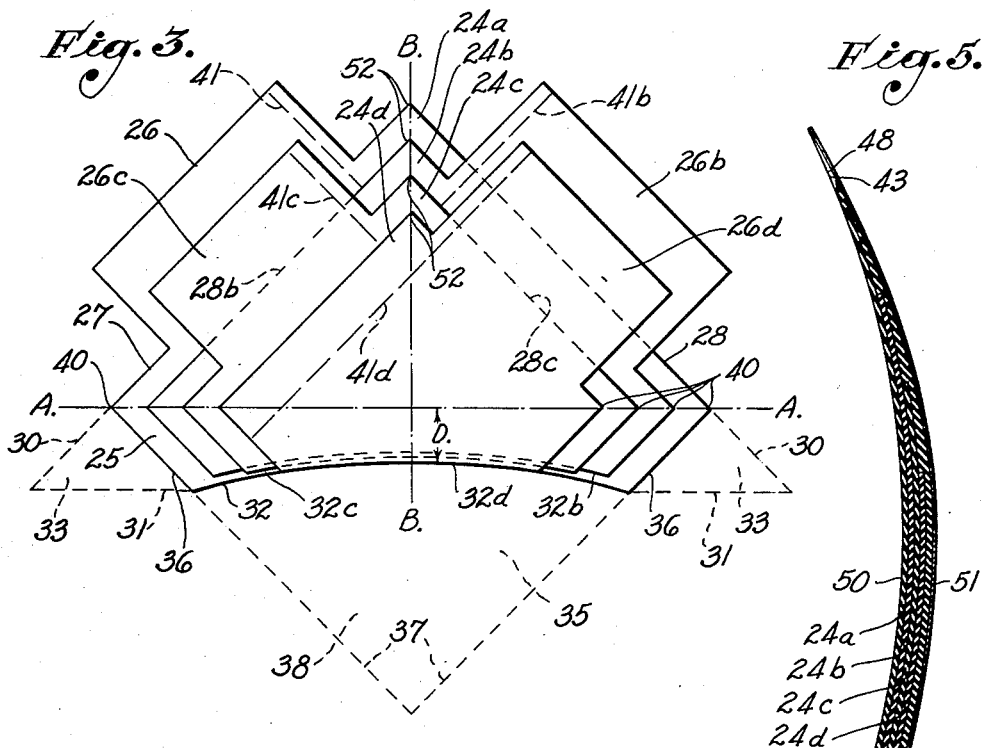
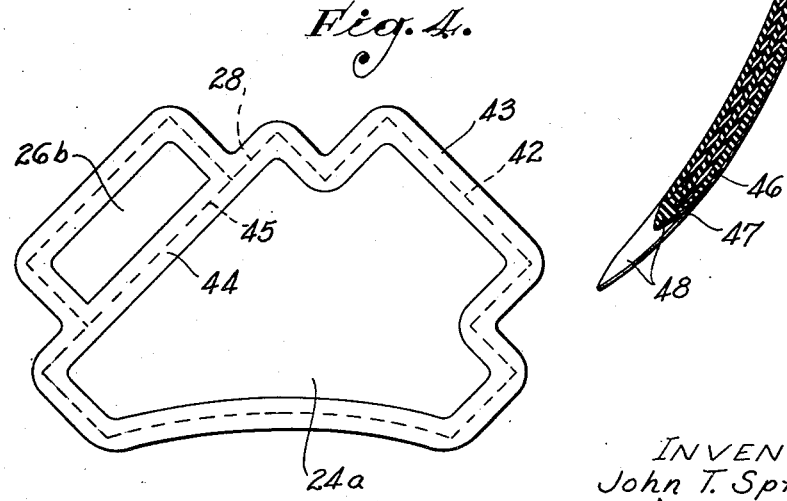

Patented Oct. 20, 1936

2,057,798

UNITED STATES PATENT OFFICE 2,057,798

CASING SIDE WALL PATCH

John T. Springer, Los Angeles, Calif., assignor, by decree of court, to Sherry Springer, widow of said John T. Springer, deceased Application February 15, 1932, Serial No. 592,873

24 Claims. (Cl. 152—26)

My invention relates to patches for use in repairing tire casings, and relates particularly to a cord-reinforced side wall patch for use in reinforcing and repairing breaks or injuries in the side walls of tire casings.

Repair of side wall injuries or breaks in tire casings under present methods takes considerable time and skill. Such repairs are accordingly relatively expensive, and it is found that even where great care is exercised by the workman in building up a side wall by crossing strips of cord rubber, there is no assurance when the job is completed that a perfect patch has been made, for the reason that the strips of cord rubber may be displaced in the curing of the added rubber material.

The first step of repairing a side wall injury in the present methods is to chamfer back the external rubber around the break in the side wall. By the use of strips of cord stock the inner casing wall is built up over or adjacent the position of the break in the casing wall. For best results in a repair the cords of the individual layers should lie at right angles to each other, but in placing the cord strips on the inside of the casing it is difficult for the workman to maintain this relationship, as in stretching the cord strips into position, it is difficult to maintain the proper angular relationship between the overlying cords, with the result that the cord strips are often placed in acute angle relationship instead of with the cords perpendicular. Involved in the repair of a casing are the cutting of raw stock to proper size and the placing of the raw stock in the repaired casing, and cutting of the raw stock involves more or less waste of material. In addition to the foregoing, the manner of cutting the edges of the raw stock leaves edges of the cord exposed within the tire so that there is a constant tendency to chafe the inner tube employed in the tire.

It is an object of my invention to provide a side wall patch for tire casings composed of layers of cord material placed with the cords thereof in perpendicular relationship, and being of such character that it may be quickly placed within a casing and vulcanized in place, thereby resulting in a saving of from fifty percent to ninety percent of the labor ordinarily involved in the making of a side wall repair. Owing to economy in manufacture, this improved side wall patch may be placed in the hands of the user at a cost no greater than the cost of the raw cord stock which he would ordinarily employ in making a side wall repair, for it is to be remembered that the material used in making a side wall repair includes not only the cord stock placed in the tire but the wasted material resulting from cutting the cord stock to desired size.

It is a further object of the invention to provide a side wall patch for tire casings so constructed that it will readily flex with the casing during the use of the tire casing on a motor vehicle, the parts of the patch being so proportioned that no abrupt bending resistance is encountered. Accordingly, a minimum of heat is produced by friction in the tire patch when it is in use in a casing.

Further objects and advantages of the invention will be made evident throughout the following part of the specification.

Referring to the drawings, which are for illustrative purposes only,

Fig. 1 is a cross section through a tire casing, showing the manner in which my new side wall patch is used therein.

Fig. 2 is a fragmentary view looking, as indicated by the arrow 2 of Fig. 1, at the inner wall of the casing with the side wall patch in place.

Fig. 3 is a view showing the manner in which sheets of cord-reinforced rubber are placed together in forming the patch.

Fig. 4 is a view showing the manner in which the edge sealing strips are placed on the patch.

Fig. 5 is an enlarged cross section through a completed patch.

Fig. 6 is a view similar to Fig. 3 but showing alternative forms of cord rubber placed together in accordance with the principles of my invention.

In Fig. 1 I show in section a tire casing 11 with a rupture 12 in the side wall 13 thereof. In preparation for making a repair, the casing wall structure is trimmed down around the rupture as indicated at 14, and the inner face 15 of the wall 13 surrounding the rupture 12 is cleaned and preferably coated with a cement solution, after which a casing patch 16 is applied to the wall 15, the trimmed outer portion of the wall 13 is built up with raw rubber stock as indicated by dotted lines 17, and the casing is placed in a mold for curing. As shown in Fig. 2, the patch 16 is placed in a position substantially centralized with respect to the rupture 12 and with the lower edge 18 thereof lying close and substantially parallel to the lower edge 20 of the casing bead 21. The preferred form of my new side wall patch has a characteristic form or outline 22 which results from the embodiment in its manufacture of principles which I have developed, but this outline may be considerably varied without departing from the principles of construction, as will be made evident in the following part of the specification.

In Fig. 3 I show the preferred manner of laying up sheets of cord-reinforced rubber whereby to produce the main body of the side wall patch 16. From cord-reinforced sheet rubber stock an outer or bottom member 24a is formed having a body portion 25 of modified triangular form and a tab portion 26 of rectangular form extending from an edge 27 of the body 25. By the term "modified triangular form" I mean that if the lateral edges 27 and 28 were projected, as indicated at 30, to meet lines 31 projected from the base edge 32 of the member 25, a complete triangle would be formed. The base edge 32 is preferably curved so that the lower edge 18 of the finished patch 16, Fig. 2, will coincide with the curvature of the edge 20 of the casing 11. In its modified form the body 25 consists of a triangle with the corners 33 thereof removed. The body 25 also forms part of a square or rectangular figure 35 consisting of the edges 27 and 28, edges 36, and dotted lines 31 formed by cutting off the lower part 38 of the square 35 along the base line 32 at a distance D below and substantially parallel to a diagonal center line extending through corners 40 formed by the meeting of the edges 27 and 36 and 28 and 36 of the body 25. The member 24a is so formed that the cord reinforcement extends parallel to the edge 28 and therefore projects from the body 25 into the tab 26, as indicated by dotted lines 41. On the member 24a members 24b, 24c, and 24d are consecutively laid, these members each being cut from reinforced cord rubber stock and each having the characteristic form described relative to the member 24a but each being consecutively smaller than the preceding member, as shown. Accordingly, the member 24b will have a tab 26b which projects over the edge 28 of the member 24a, the member 24c will have a tab 26c which projects over the edge 28b of the member 24b and engages the member 24a, and the member 24d will have a tab 26d which extends over the edge 28c of the member 24c and engages the member 24b. The lower edge 32d of the member 24d may coincide with the edge 32 of the member 24a. The lower edges 32b and 32c of the members 24b and 24c preferably lie above the lower edge 32 of the member 24a, as shown in Fig. 3, the purpose of placing these lower edges in staggered relationship being to prevent the building up of a heavy shoulder at the lower edge of the casing patch. The assembly of members 24a, 24b, 24c, and 24d is then turned over, as indicated in Fig. 4, so that the larger or outer member 24a will face the workman, who then proceeds to apply to the periphery 42 of the patch structure a strip 43 of raw cushion rubber stock which is preferably so placed along the edge of the patch structure that equal widths of the strip 43 will project inside and outside of the periphery 42. A strip 44 of cushion rubber stock is also placed over the portion 45 of the edge 28 which crosses the tab 26b of the underlying member 24b.

The patch structure is taken from the operation indicated in Fig. 4 and placed in a mold which is curved to conform to the inner wall of a tire casing, and while being pressed tightly against the inner wall of this mold by use of an expansible bag or sand bag, the rubber material is partly vulcanized. At least enough heat is applied to cause the rubber to flow freely, with the result that the strips 43 and 44 of cushion rubber are flattened out, and with the result that the edge strip 43 flows over the exposed ends of the cord so as to seal the peripheral edges, cover the exposed cord in such edges, and provide resilient, outwardly tapering fins extending around the periphery of the patch but forming an integral part of the patch. A sheet 46 of raw cushion stock is then applied to the front of the patch structure or to the surface presented upwardly in Fig. 3, there being a sheet of protecting fabric 47, such as holland, on the outer face of the cushion layer 46, as indicated in Fig. 5. The cushion layer 46 and the protecting fabric 47 are trimmed to agree with the contour of the sealing strip 43.

When the patch is installed in a casing, as shown in Fig. 1, the fin 48 provides a means of exceptional resilience for securing the edges of the patch to the wall of the casing in a manner to prevent chafing of the tube employed in the casing. The fin 48 along the lower edge or base of the patch fits closely to the inner portion 57 of the tire bead 21 so that an abrupt shoulder or edge, which might injure the tube, is avoided at this point, this being a decided improvement over the hand method of applying reinforcing strips which are cut off so as to leave exposed edges to chafe the inner tube. As shown in Fig. 5, the sealing strip 43, when heated, flows outwardly to form a relatively knife-edged fin 48, and the edges of the members 24b, 24c, and 24d not covered by the sealing strip are chamfered off or depressed, with the result that the inner and outer faces 50 and 51 of the tire patch are substantially smooth and continuous.

As will be noted in Fig. 3, the cord reinforcing, extending in directions indicated at 41b, 41c, and 41d, extends into the tabs of the respective members 24b, 24c, and 24d, with the result that the cord reinforcing of each consecutive member 24a, 24b, 24c, and 24d lies at a right angle relative to the reinforcing of the member lying adjacent thereto. The first and third, or odd consecutive members 24a and 24c, are tied together by the overlapping of the tab 26c on the tab 26, and the second and fourth, or even consecutive members 24b and 24d, are tied together by the overlapping of the tab 26d on the tab 26b. It will be noted that the corners 40 of the members 24a, 24b, 24c, and 24d are stepped inwardly so that an approximately gradual increase in the thickness of the patch is accomplished proceeding from the corners 40 of the member 24a inwardly along the diagonal center line A—A. As will be noted from Fig. 3, the members 24a, 24b, 24c, and 24d have upwardly directed corners 52, which, due to the decrease in size of the members 24a, 24b, 24c, and 24d, are offset inwardly in a manner to provide a substantially gradual increase in thickness of the tire patch proceeding downwardly from the upper corner 52.

In Fig. 3 the line B—B represents the central axis or dividing line of the tire patch, which, in the use of the tire patch in a casing as shown in Fig. 2, should coincide with a radial line through the casing, this resulting in the reinforcing cords of the tire patch extending at angles of forty-five degrees relative to a radial line projected through the casing whenever the patch is placed in the casing with the lower base edge 18 thereof parallel to the lower edge 20 of the casing, thereby assuring the proper placing of the reinforcing cords in the patch relative to the flexure of the tire with which the patch is used.

A principle of my construction appears to reside in the placing together of cord-reinforced rubber sheets of regularly decreased size, having substantially straight base edges and being equipped with tabs which project therefrom so that the odd and even consecutive layers of reinforced cord material will be tied together by means of the tabs. In the preferred practice of the invention the overlying sheets are preferably triangular or of modified triangular form as shown, but the practice of the invention is not confined to the details of construction shown in Figs. 3 and 4.

A considerable departure in form may be made without departing from the spirit of the invention. In Fig. 6 I show a tire patch 60 consisting of consecutive sheet members 61a, 61b, 61c, and 61d of modified oval form, each of these sheets being reinforced and having projecting tabs 62a, 62b, 62c, and 62d projecting diagonally from the respective edges thereof whereby to tie the members 61a, 61b, 61c, and 61d together.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A side wall casing patch of the character described, including: a plurality of cord fabric ply members placed consecutively one upon the other, each consecutive ply member being smaller than the preceding one and having a tab extending therefrom, all of said ply members being of approximate triangular form, and having the cords thereof extending diagonally with respect to the bases of the triangles, and with the cords in alternate ply members in crossing relation.

2. A side wall casing patch of the character described, including: a plurality of cord fabric ply members placed consecutively one upon the other, each consecutive ply member being smaller than the preceding one and having a tab extending therefrom, all of said ply members being of approximate triangular form and having the bases thereof parallel to the lower edge of said casing patch, and having the cords thereof extending diagonally with respect to the bases of the triangles, and with the cords in alternate ply members in crossing relation.

3. A side wall casing patch of the character described, including: a plurality of ply members placed consecutively one upon the other, each consecutive ply member being smaller than the preceding one and having a tab extending therefrom, all of said ply members being of approximate triangular form and having the bases thereof parallel to the lower edge of said casing patch, the lower edge of said casing patch being curved to correspond to the curvature of a tire bead.

4. A side wall casing patch of the character described, including: a plurality of ply members placed consecutively one upon the other, each consecutive ply member being smaller than the preceding one and having a tab extending therefrom, all of said ply members being of approximate triangular form and having the bases thereof parallel to the lower edge of said casing patch, each of said ply members having cord reinforcing extending diagonally relative to its base, the cord of the odd consecutive ply members lying in cross relationship to the cord of the even consecutive ply members.

5. A side wall casing patch of the character described, including: a plurality of ply members placed consecutively one upon the other, each consecutive ply member being smaller than the preceding one and having a tab extending therefrom, all of said ply members being of approximate triangular form and having the bases thereof parallel to the lower edge of said casing patch, the lower edge of said casing patch being curved to correspond to the curvature of a tire bead, each of said ply members having cord reinforcing extending diagonally relative to its face, the cord of the odd consecutive ply members lying in cross relationship to the cord of the even consecutive ply members.

6. A side wall casing patch of the character described, including: a plurality of ply members placed consecutively one upon the other, each consecutive ply member consisting of a body portion having a base edge and a tab extending from another edge portion thereof and diagonally relative to said base edge.

7. A side wall casing patch of the character described, including: a plurality of ply members placed consecutively one upon the other, each consecutive ply member being of smaller size than the preceding one and consisting of a body portion having a base edge and a tab extending from another edge portion thereof and diagonally relative to said base edge.

8. A side wall casing patch of the character described, including: a plurality of ply members placed consecutively one upon the other, each consecutive ply member consisting of an approximately triangular body portion having a base edge and a tab extending from another edge portion thereof and diagonally relative to said base edge.

9. A side wall casing patch of the character described, including: a plurality of ply members placed consecutively one upon the other, each consecutive ply member being of smaller size than the preceding one and consisting of an approximately triangular body portion having a base edge and a tab extending from another edge portion thereof and diagonally relative to said base edge.

10. A side wall casing patch of the character described, including: a plurality of ply members placed consecutively one upon the other, each consecutive ply member being of smaller size than the preceding one and consisting of a body portion having a base edge and a tab extending from another edge portion thereof and diagonally relative to said base edge, there being cord reinforcing in each of said ply members extending from its body portion into its tab, the cord of one ply member being in crossing relation to the cord of another ply member.

11. A side wall casing patch of the character described, including: a plurality of ply members placed consecutively one upon the other, each consecutive ply member being of smaller size than the preceding one and consisting of an approximately triangular body portion having a base edge and a tab extending from another edge portion thereof and diagonally relative to said base edge, there being cord reinforcing in each of said ply members extending from its body portion into its tab, the cord of one ply member being in crossing relation to the cord of another ply member.

12. A side wall casing patch of the character described, including: a plurality of ply members placed consecutively one upon the other, each consecutive ply member being of smaller size than the preceding one and consisting of a body portion having a base edge and a tab extending from another edge portion thereof and diagonally relative to said base edge, there being cord reinforcing in each of said ply members extending from its body portion into its tab, the cord of one ply member being in crossing relation to the cord of another ply member, the tabs of the odd consecutive ply members being disposed in the same direction and the tabs of the even consecutive ply members being disposed in the same direction.

13. A side wall casing patch of the character described, including: a plurality of ply members placed consecutively one upon the other, each consecutive ply member being of smaller size than the preceding one and consisting of an approximately triangular body portion having a base edge and a tab extending from another edge portion thereof and diagonally relative to said base edge, there being cord reinforcing in each of said ply members extending from its body portion into its tab, the cord of one ply member being in crossing relation to the cord of another ply member, the tabs of the odd consecutive ply members being disposed in the same direction and the tabs of the even consecutive ply members being disposed in the same direction.

14. A side wall casing patch of the character described, including: a plurality of ply members placed consecutively one upon the other, each consecutive ply member being of smaller size than the preceding one and consisting of a body portion having a base edge and a tab extending from another edge portion thereof and diagonally relative to said base edge, there being cord reinforcing in each of said ply members extending from its body portion into its tab, the cord of one ply member being in crossing relation to the cord of another ply member, one of said ply members being connected to a second consecutive ply member by a tab of such consecutive ply member.

15. A side wall casing patch of the character described, including: a plurality of ply members placed consecutively one upon the other, each consecutive ply member being of smaller size than the preceding one and consisting of an approximately triangular body portion having a base edge and a tab extending from another edge portion thereof and diagonally relative to said base edge, there being cord reinforcing in each of said ply members extending from its body portion into its tab, the cord of one ply member being in crossing relation to the cord of another ply member, the tabs of the odd consecutive ply members being disposed in the same direction and the tabs of the even consecutive ply members being disposed in the same direction, one of said ply members being connected to a second consecutive ply member by a tab of such consecutive ply member.

16. A side wall casing patch of the character described, including: a plurality of ply members placed consecutively one upon the other, each consecutive ply member being of smaller size than the preceding one and consisting of a body portion having a base edge and a tab extending from another edge portion thereof and diagonally relative to said base edge, there being cord reinforcing in each of said ply members extending from its body portion into its tab, the cord of one ply member being in crossing relation to the cord of another ply member, one of said ply members being connected to a second consecutive ply member by a tab of such consecutive ply member, said patch being molded to conform to the curvature of a casing side wall.

17. A side wall casing patch of the character described, including: a plurality of cord fabric ply members placed consecutively one upon the other, each consecutive ply member consisting of a body portion having a base edge and a tab extending from another edge portion thereof and diagonally relative to said base edge.

18. A side wall casing patch of the character described, including: a plurality of cord fabric ply members placed consecutively one upon the other, each consecutive ply member consisting of a body portion having a base edge and a tab extending from another edge portion thereof and diagonally relative to said base edge, and having the cords thereof extending diagonally from its body portion into its tab, the cords in alternate ply members being in crossing relation.

19. A side wall casing patch of the character described, including: a plurality of cord fabric ply members placed consecutively one upon the other, each consecutive ply member being of approximate triangular form and smaller than the preceding one, all of said ply members having the bases thereof parallel to the lower edge of said casing patch, the cords of said ply members extending diagonally with respect to the bases of the triangles, and with the cords in alternate ply members in crossing relation.

20. A side wall casing patch of the character described, including: a plurality of cord ply members placed consecutively one upon the other with the cords thereof in crossing relation, each ply member being elongated in the direction of the cords therein and having a base edge cut diagonally with respect to the cords therein, said ply members being placed together so that the base edges thereof lie relatively close together and the ends thereof project so as to form tabs extending from a triangular body area.

21. A molded side wall casing patch of the character described, including: a plurality of cord ply members molded together in superimposed relation with the cords thereof in crossing relation, each ply member being elongated in the direction of the cords therein and having a base edge cut diagonally with respect to the cords therein, said ply members being placed together so that the base edges thereof lie relatively close together and the ends thereof project so as to form tabs extending from a triangular body area, the outer face of said patch being molded to a continuously smooth surface extending completely to the edges of the patch.

22. A side wall casing patch of the character described, including: a plurality of cord ply members placed consecutively one upon the other with the cords thereof in crossing relation, each ply member having a base edge cut diagonally with respect to the cords therein, said ply members being placed in such superimposed relation that the base edges thereof lie relatively close together and form a relatively thick base edge for the casing patch.

23. A side wall casing patch of the character described, including: a plurality of cord ply members placed consecutively one upon the other with the cords thereof in crossing relation, each ply member having a base edge cut diagonally with respect to the cords therein, said ply members being placed in such superimposed relation that the base edges thereof lie relatively close together and form a relatively thick base edge for the casing patch, said ply members being so formed that when placed together as stated they form a patch having an approximately triangular body area.

24. A side wall casing patch of the character described, including: a plurality of cord ply members placed consecutively one upon the other with the cords thereof in crossing relation, each ply member having a base edge cut diagonally with respect to the cords therein, said ply members being placed in such superimposed relation that the base edges thereof lie relatively close together and form a relatively thick base edge for the casing patch, said ply members being so formed that when placed together as stated they form an approximately triangular body area with tabs extending therefrom.

JOHN T. SPRINGER.